(No Model.)   8 Sheets—Sheet 1.

G. B. MASSEY, Dec'd.
S. R. Massey & S. A. Bryant, Administrators.
CASH REGISTER AND CHECK MACHINE.

No. 446,262.   Patented Feb. 10, 1891.

WITNESSES:
J. C. Criswell
C. Sedgwick

G. B. Massey
INVENTOR: deceased
S. R. Massey
S. A. Bryant
BY Munn & Adams
ATTORNEYS (No Model.) 8 Sheets—Sheet 2.

G. B. MASSEY, Dec'd.
S. R. MASSEY & S. A. BRYANT, Administrators.
CASH REGISTER AND CHECK MACHINE.

No. 446,262. Patented Feb. 10, 1891.

Fig. 2.

WITNESSES:
J. A. Criswell
C. Sedgwick

G. B. Massey
INVENTOR: deceased
S. R. Massey
S. A. Bryant
Adm'rs
BY
Munn & Co.
ATTORNEYS (No Model.) 8 Sheets—Sheet 3.

G. B. MASSEY, Dec'd.
S. R. Massey & S. A. Bryant, Administrators.
CASH REGISTER AND CHECK MACHINE.

No. 446,262. Patented Feb. 10, 1891.

Fig. 3.

WITNESSES:
J. M. Criswell
C. Sedgwick

INVENTOR: G. B. Massey, deceased
S. R. Massey
S. A. Bryant
BY Munn & Co.
ATTORNEYS (No Model.)  8 Sheets—Sheet 5.

G. B. MASSEY, Dec'd.
S. R. Massey & S. A. Bryant, Administrators.
CASH REGISTER AND CHECK MACHINE.

No. 446,262.  Patented Feb. 10, 1891.

WITNESSES:
INVENTOR: G. B. Massey, deceased
BY S. R. Massey
S. A. Bryant, Adm'rs
Munn & Co.
ATTORNEYS (No Model.) 8 Sheets—Sheet 6.

G. B. MASSEY, Dec'd.
S. R. Massey & S. A. Bryant, Administrators.
CASH REGISTER AND CHECK MACHINE.

No. 446,262. Patented Feb. 10, 1891.

(No Model.) 8 Sheets—Sheet 7.
G. B. MASSEY, Dec'd.
S. R. Massey & S. A. Bryant, Administrators.
CASH REGISTER AND CHECK MACHINE.

No. 446,262. Patented Feb. 10, 1891.

(No Model.)
8 Sheets—Sheet 8.

G. B. MASSEY, Dec'd.
S. R. MASSEY & S. A. BRYANT, Administrators.
CASH REGISTER AND CHECK MACHINE.

No. 446,262. Patented Feb. 10, 1891.

WITNESSES:

UNITED STATES PATENT OFFICE.

SARAH R. MASSEY AND STANLEY A. BRYANT, OF MAMARONECK, NEW YORK, ADMINISTRATORS OF THE ESTATE OF GIDEON B. MASSEY, DECEASED.

CASH-REGISTER AND CHECK MACHINE.

SPECIFICATION forming part of Letters Patent No. 446,262, dated February 10, 1891.

Application filed April 29, 1890. Serial No. 350,226. (No model.)

*To all whom it may concern:*

Be it known that we, SARAH R. MASSEY and STANLEY A. BRYANT, both of Mamaroneck, in the county of Westchester and State of New York, administrators of the estate of GIDEON B. MASSEY, deceased, who did in his lifetime invent a new and Improved Cash-Register and Check Machine, do declare the following to be a full, clear, and exact specification of the same, reference being had to the annexed drawings, forming a part thereof, in which—

Similar letters of reference indicate corresponding parts in all the views.

Figure 1:
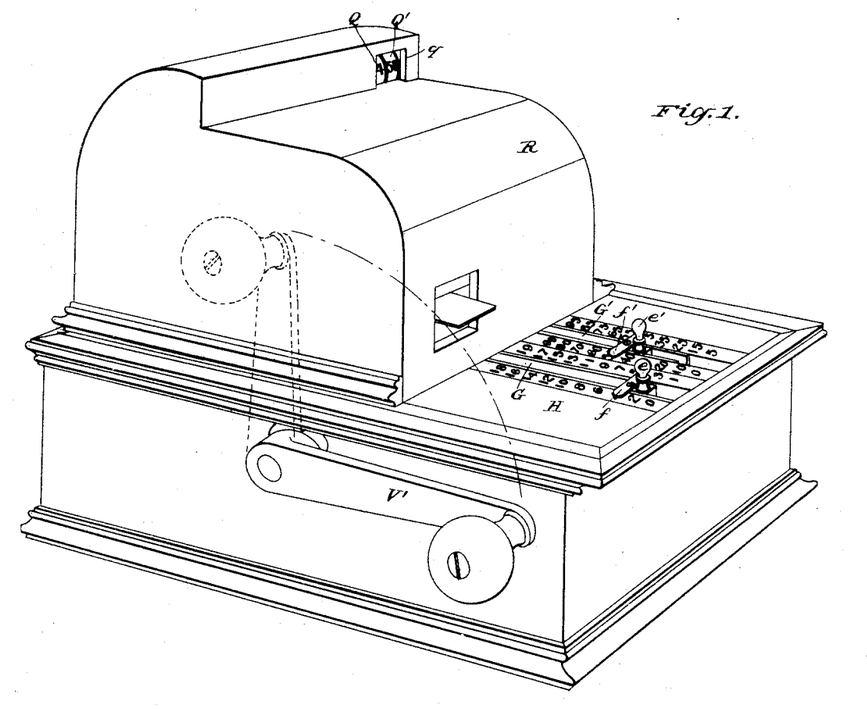
Figure 1 is a perspective view of the improved cash-register and check machine.
Figure 2:
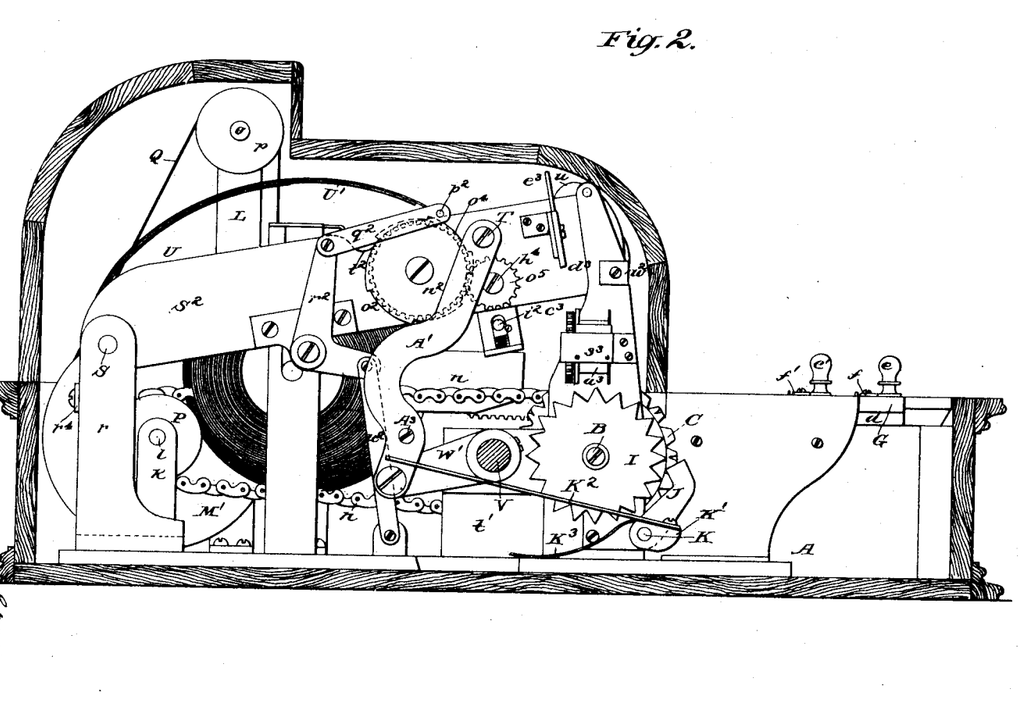
Fig. 2 is a left-hand side elevation of the machine with the casing removed.
Figure 3:
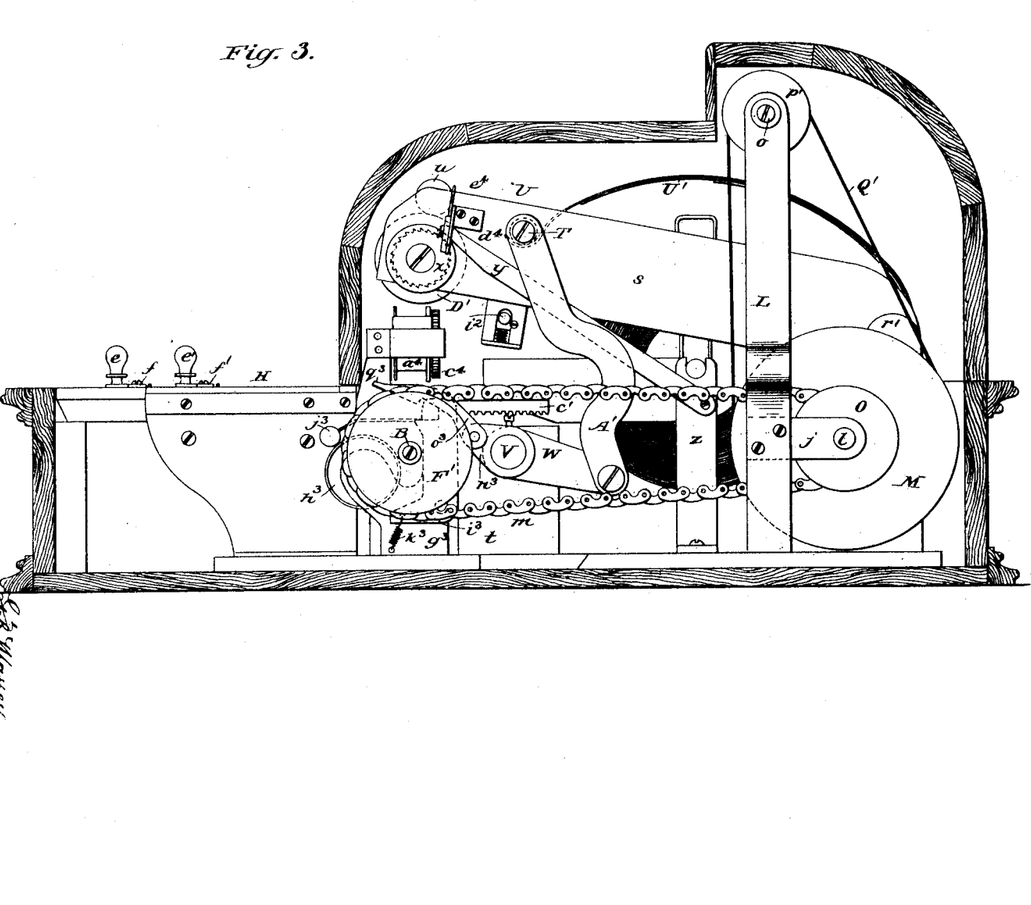
Fig. 3 is a right-hand side elevation of the machine with the casing removed.
Figure 4:
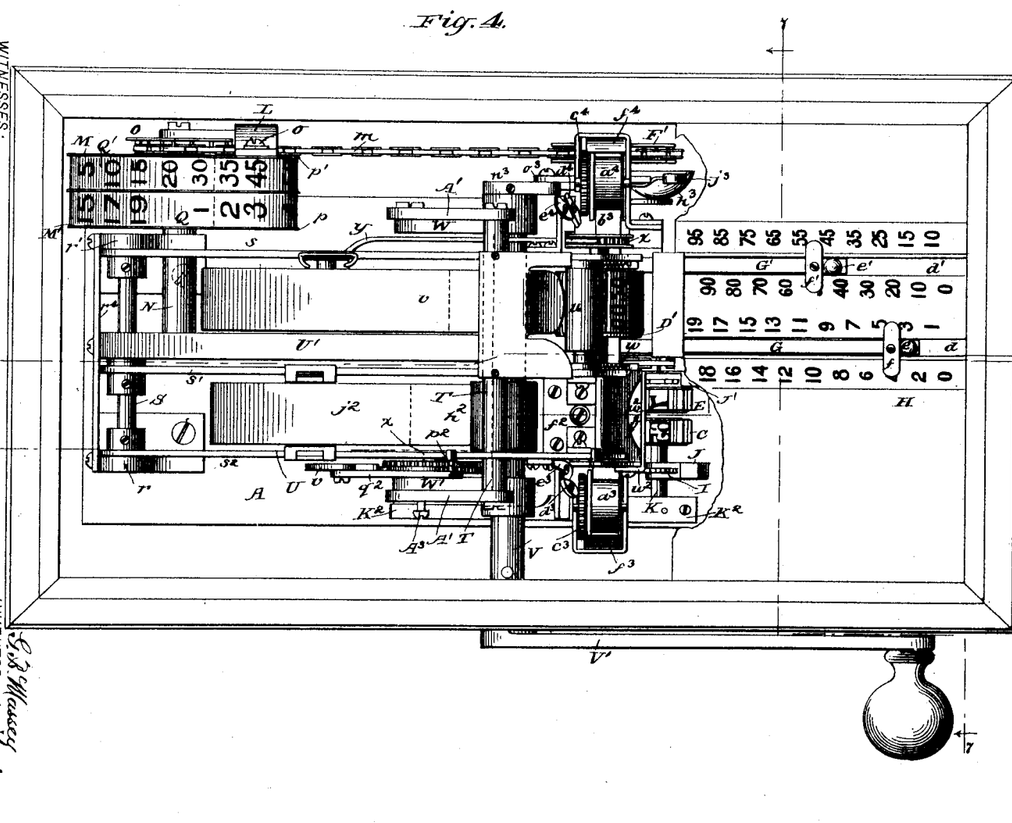
Fig. 4 is a plan view of the machine with the casing removed.
Figure 5:
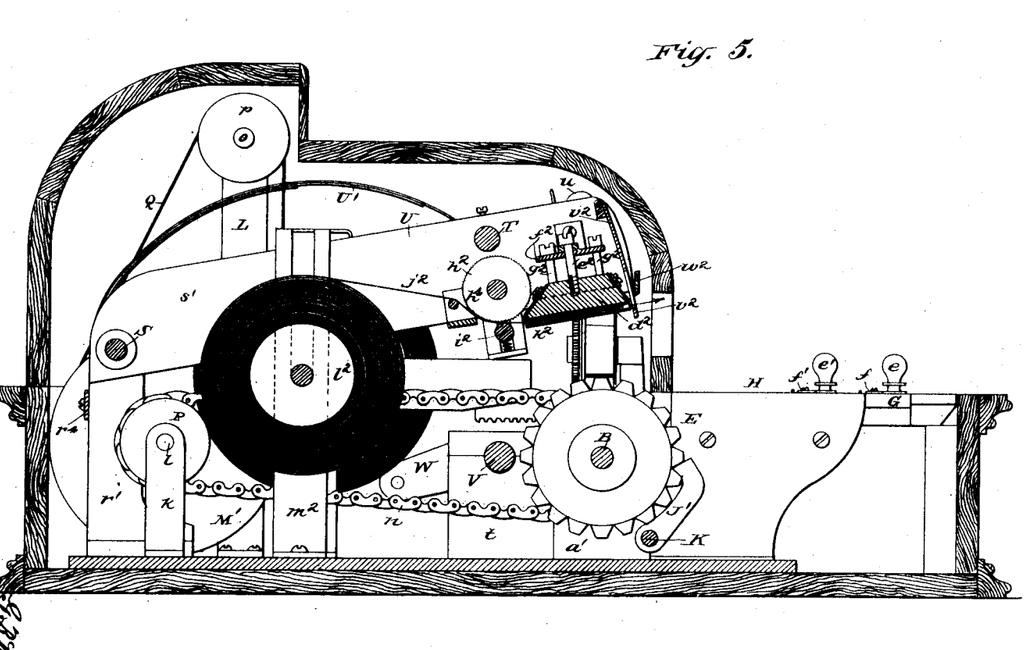
Fig. 5 is a vertical longitudinal section taken on line 5 5 in Figs. 4 and 7, looking in the direction indicated by the arrows.
Figure 6:
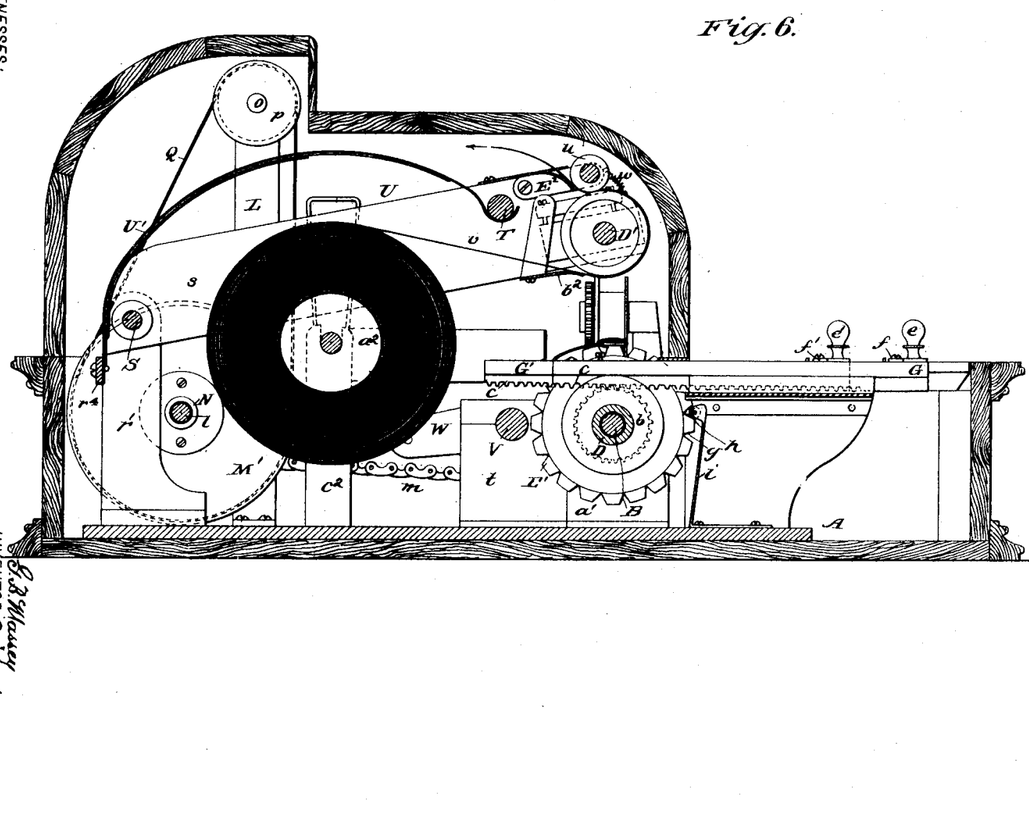
Fig. 6 is a vertical longitudinal section taken on the line 6 6 in Figs. 4 and 7, looking in the direction indicated by the arrows.
Figure 7:
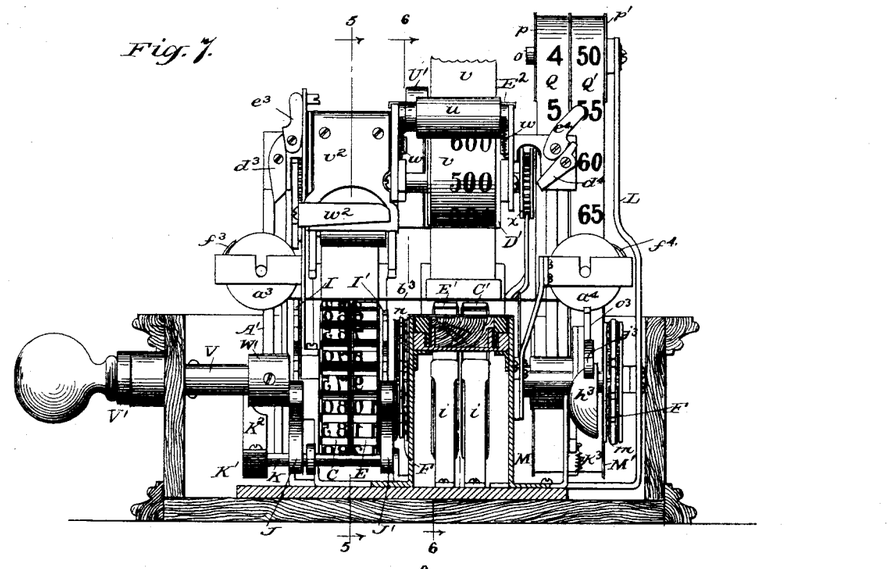
Fig. 7 is a vertical transverse section taken on line 7 7 in Fig. 4, looking in the direction indicated by the arrows.
Figure 8:
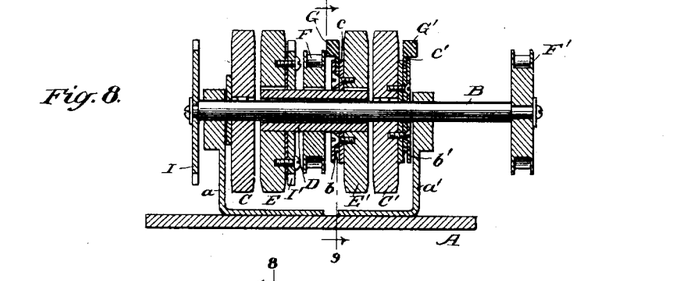
Fig. 8 is a vertical transverse section of the number-wheels and mechanism connected therewith, taken on line 8 8 in Fig. 9.
Figure 9:
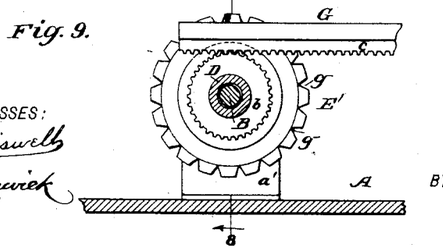
Fig. 9 is a vertical transverse section taken on line 9 9 in Fig. 8.
Figure 10:
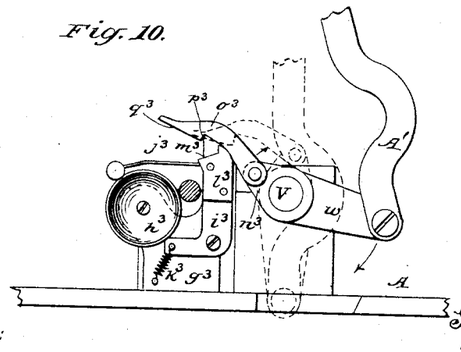
Fig. 10 is a side elevation of the bell-striking mechanism.
Figure 11:
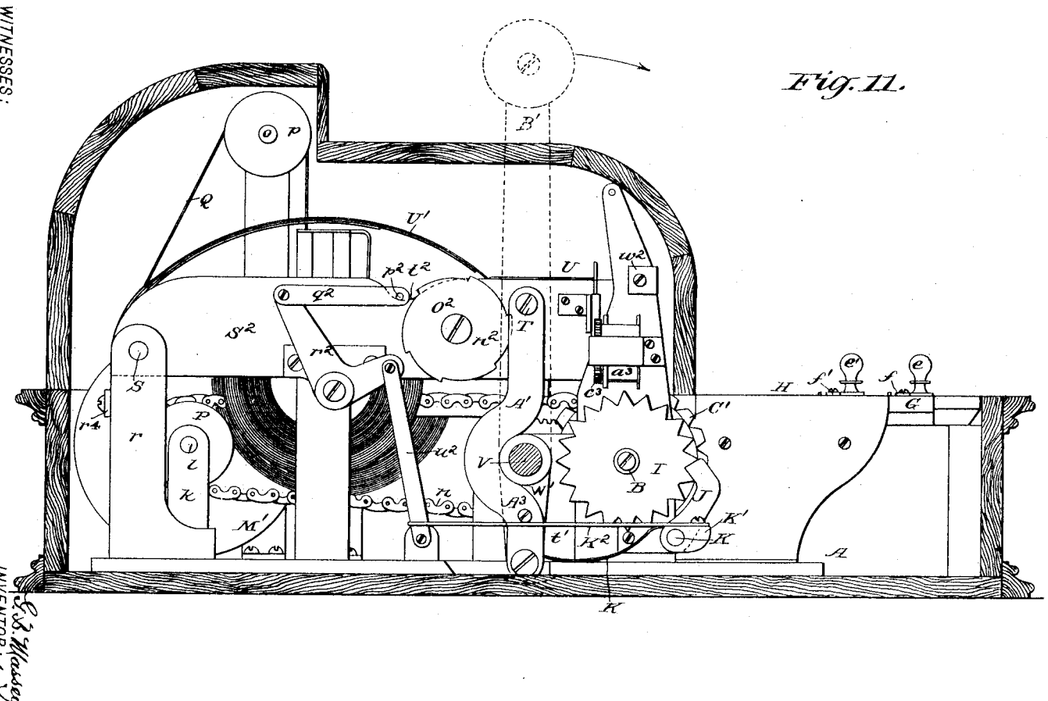
Fig. 11 is a left-hand side elevation of the machine with the casing removed, showing the position of the parts while printing a check.

The object of the invention is to construct a check-printing machine which will print, number, and cut off checks in succession, and at the same time produce a continuous record of the numbers of the checks.

The object of the invention is also, further, to provide a simple and effective indicator for showing the position of the check-numbering wheels.

The invention consists in the combination, with two sets of number-wheels and mechanism for operating the same, of two sets of printing devices adapted to print simultaneously and two sets of number-wheels, one for printing upon the check to be discharged and cut off, the other for printing upon the record-strip retained in the machine.

The invention further consists in the combination, with the number-wheels, of indicating mechanism for showing the position of the number-wheels previous to printing.

It also further consists in novel mechanism for causing the number-wheels to register, thereby securing alignment in the printing of the numbers.

It also consists in bell-operating mechanism connected with the printing devices and arranged to give an alarm whenever a check is printed and cut off.

In standards $a\ a'$, secured to the base A, is journaled a shaft B, to which are secured number-wheels C C', and upon which, between the said number-wheels, is loosely placed a sleeve D, upon which are mounted number-wheels E E'. To the same sleeve is secured a sprocket-wheel F, and to one end of the shaft B is secured a similar sprocket-wheel F'. To the inner side of the number-wheel E' is secured a pinion $b$, and to the outer side of the number-wheel C' is secured a pinion $b'$. These pinions are engaged by racks $c\ c'$, secured to the bars G G'. The bars G G' slide in grooves $d\ d'$ in the table H, and the bars are provided with knobs $e\ e'$ and with cross-bars $f\ f'$, extending a short distance over the upper surface of the table. Upon the top of the table are arranged rows of figures and ciphers, ranging from 0 to 19 on the left-hand column and from 0 to 95 on the right-hand column, these figures being arranged with all the even numbers upon one side of the grooves $d\ d'$ and all the odd numbers upon the opposite side. They are arranged in the paths of the cross-bars $f\ f'$, which serve as indexes. The bar G and rack attached thereto move the wheels E E', and the bar G' and rack attached thereto move the wheels C C', attached to the shaft B. The numbers upon the wheels C E are oppositely arranged with respect to the numbers upon the wheels E' C', so that while the numbers upon the tickets printed from the wheels C E are inverted as they issue from the machine the numbers printed from the wheels E' C' are right side up.

The shaft B carries a star-wheel I and the sleeve D carries a star-wheel I'. These wheels are engaged by registering-levers J J', attached to the rock-shaft K, journaled in ears projecting from the standards $a$ $a'$.

To the end of the shaft K is secured a hub K', to which are attached the spring-arm $K^2$ and the curved spring $K^3$. The spring-arm $K^2$ projects forward into the path of a stud $A^3$, projecting from the connecting-rod A', and the spring $K^3$ presses upon the base-plate of the machine and tends to throw the registering-levers J J' out of engagement with the wheels I I'.

In addition to the registering mechanism already described, the peripheries of the wheels E' C' are provided with notches $g$ for receiving rollers $h$, carried by the springs $i$, secured to the base-plate A.

In an arm $j$, projecting from the standard L, and in a standard $k$, attached to the base-plate A, is secured a rod $l$, upon which are placed the wheel M and the sleeve N. The wheel M is provided with a sprocket-wheel O, which is connected by a chain $m$ with the sprocket-wheel F' on the shaft B. Upon the end of the sleeve N adjoining the wheel M is mounted the wheel M', and upon the opposite end of the said sleeve is mounted the sprocket-wheel P, which receives its motion from the shaft B through the chain $n$, running around the sprocket-wheel F on the sleeve D.

In the upper end of the standard L is inserted a stud $o$, upon which are placed pulleys $p$ $p'$. Upon the pulley $p$ and wheel M' is placed an endless belt Q, carrying numbers corresponding to the hundreds on the number-wheels and on the table H, and upon the pulleys M and $p'$ is placed a belt Q', carrying numbers corresponding to the units and tens of the table H and the number-wheels.

In the front of the casing R, which incloses the mechanism, is an aperture $q$, through which are displayed figures corresponding with the numbers to be printed in a manner presently to be described. Standards $r$ $r'$, attached to the base A, support a rod S, upon which are pivoted arms $s$ $s'$ $s^2$, the free ends of which are secured to a cross-bar T, passing through the arms, the said arms and cross-bar forming the printing-frame U.

In standards $t$ $t'$, attached to the base-plate A, is journaled a rock-shaft V, which carries the crank-arms W W', which are connected with opposite ends of the bar T by the curved connecting-rods A'. The rock-shaft V extends through the casing R, and is provided with a hand-crank V', by which it may be turned.

The frame U is provided with a curved spring U', attached to the bar $r^4$, secured to the standards $r$ $r'$ and projecting underneath the bar T, the said spring being designed to lift the frame U after it has been depressed by turning the shaft V.

In the frame U is adjustably journaled an impression-roller D', and above the impression-roller is pivoted the frame $E^2$, carrying a roller $u$, which bears upon the paper strip $v$, upon which the permanent record is made. The frame $E^2$ is provided with springs $w$, which draw the roller $u$ downward into contact with the paper passing over the roller D'. The shaft of the roller D' carries a ratchet-wheel $x$, which is acted upon by a pawl $y$, pivoted to the standard $z$, attached to the base-plate, the said pawl being arranged so as to turn the ratchet-wheel $x$ and the impression-roller D' through a part of a revolution whenever the frame U is moved downward. The paper strip $v$, upon which the permanent record is printed, is taken from a reel $a^2$ and passes over a guide-plate $b^2$, attached to the frame U, thence under the impression-roller D', the said reel $a^2$ being journaled in standards $c^2$, rising from the base-plate A.

In the space in the frame U above the wheels C E is supported an adjustable platen $d^2$ by a screw $e^2$, passing through a cross-bar $f^2$ in the frame U and into the back of the platen. The impression of the platen is regulated by adjusting-screws $g^2$, passing through the bar $f^2$ and bearing upon the platen.

In the frame U behind the platen is journaled a serrated roller $h^2$, and below the said serrated roller is arranged a spring-pressed roller $i^2$, which holds the paper strip $j^2$ in contact with the said serrated roller. Below the platen $d^2$ there is a paper-guide $k^2$, which is held by the platen, and the paper strip $j^2$ is taken from a reel $l^2$, journaled in standards $m^2$ rising from the base-plate A.

Upon a stud $n^2$, projecting from the frame U, is mounted a ratchet-wheel $o^2$, which is engaged by a stud $p^2$, projecting from a bar $q^2$, which is pivoted to the angled lever $r^2$. The stud $p^2$ is provided with a roller which rides upon the edge of the arm $s^2$, the said arm being cut away to form a cam $t^2$, which allows the stud $p^2$ to engage the ratchet-wheel $o^2$ while in the lower part of the cam, but which lifts the stud out of engagement with the ratchet-wheel $o^2$ when the latter has been turned forward the required distance. The forward motion of the ratchet-wheel $o^2$ causes a sufficient quantity of paper to be carried through the rollers $h^2$ $i^2$ to form a single check. To the ratchet-wheel $o^2$ is attached a spur-wheel $o^4$, which engages a pinion $o^5$ on the shaft $h^4$ of the roller $h^2$. The shorter arm of the right-angled lever $r^2$ is connected with a link $u^2$, pivoted to an ear projecting from the base-plate A, so that whenever the frame U is carried upward after printing the upward movement of the said frame causes the right-angled lever $r^2$ to be turned on its pivot, thus throwing forward the bar $q^2$ and turning the ratchet-wheel $o^2$ through one division, carrying forward another portion of the paper strip $j^2$ preparatory to printing upon the next downward movement of the frame U.

In the free end of the frame U, in front of the platen $d^2$, is secured an apertured shear-blade $v^2$, through which the check already printed is passed during the upward movement of the frame by the feeding mechanism in the manner already described, and in the front of the machine is secured another shear-blade $w^2$, against which the shear-blade $v^2$ acts in the operation of detaching the check from the strip after printing.

In the frame of the machine are journaled the ink-ribbon bobbins $a^3$ $a^4$, which carry the inking-ribbon $b^3$. The bobbins $a^3$ $a^4$ are provided with ratchet-wheels $c^3$ $c^4$, which may be engaged by the pawls $d^3$ $d^4$, carried by the frame U, upon each downward movement of the said frame. To the supports of the pawls $d^3$ $d^4$ are pivoted cams $e^3$ $e^4$, which are adapted to engage the pawls and throw them out of engagement with the ratchet-wheels $c^3$ $c^4$. The pawls $d^3$ $d^4$ are used in alternation, thereby winding the inked ribbon from one bobbin upon the other, so as to cause the ribbon to continually present a new surface to the printing-wheels. The bobbins $a^3$ $a^4$ are prevented from moving forward more than the prescribed distance by friction-springs $f^3$ $f^4$ bearing on their peripheries.

Upon the base-plate A, near the rock-shaft V, is secured a standard $g^3$, to which is attached a bell $h^3$, and to which is pivoted an angled lever $i^3$, carrying a bell-hammer $j^3$, the said lever $i^3$ being drawn forward by a spiral spring $k^3$, connected with the standard $g^3$ and the lever $i^3$. The said lever $i^3$ is provided with a catch $l^3$, having a shoulder $m^3$.

To an arm $n^3$, attached to the shaft V, is pivoted a dog $o^3$, provided with a catch $p^3$, adapted to engage the catch $l^3$, and with a prolongation $q^3$, adapted to be engaged by the shoulder $m^3$. When the frame U is raised, after printing, by the operation of turning the shaft V, the arm $n^3$ throws forward the dog $o^3$ and brings it into engagement with the catch $l^3$, so that when the frame is again brought down to print a check, the said dog engages the catch $l^3$ and draws back the bell-hammer $j^3$ until the shoulder $m^3$, by pressing upon the prolongation $q^3$, releases the catch $l^3$ from the notch $p^3$, when the spring $k^3$ causes the bell-hammer to strike the bell.

The operation is as follows: The number-wheels are arranged for printing by moving the bars G G' until their indexes $f$ $f'$ are opposite the figures to be printed upon the ticket. This operation turns the number-wheels so as to present the faces carrying the numbers corresponding to the numbers on the table H to the printing mechanism. The same operation turns the endless belts Q Q' so as to cause them to display at the opening $q$ in the casing R. The paper strips $v$ and $j^2$ having been moved forward to present a new surface to the number-wheels in the manner already described, the lever V' is moved forward, causing the frame U to descend, carrying the paper strips into contact with the printing mechanism, pressing the latter upon the faces of the number-wheels, at the same time bringing forward the registering-levers J J' into engagement with the wheels I I' by the contact of the stud $A^3$ with the arm $K^2$, thus causing the said levers J J' to lock the number wheels against movement. During this operation the dog $o^3$ is brought into engagement with the catch $l^3$, drawing back the bell-hammer $j^3$, and as the printing is completed the dog $o^3$ is released in the manner previously described, allowing the bell-hammer $j^3$ to strike the bell and thus indicate that the ticket has been printed. As the frame U is allowed to rise by the action of the spring U', the check is cut from the strip $j^2$ by the shear-blades $w^2$ $v^2$, when the machine is ready for another operation. Whenever the lever V' is moved forward, the permanent record-strip $v$ and the ticket-strip $j^2$ are moved forward preparatory to taking another impression.

Having thus described the invention, we claim as new and desire to secure by Letters Patent—

1. In a check-printing machine, the combination of two sets of number-wheels, the numerals of one set being arranged in an order the reverse of that of the other set, two bars for actuating the number-wheels, paper-feeding mechanism for each set of wheels, and mechanism for producing impressions upon the permanent record-strip and upon the check-strip, substantially as specified.

2. In a check-printing machine, the combination of two series of number-wheels oppositely arranged with respect to each other, one wheel of each series being attached permanently to a shaft, the other wheel of each series being attached permanently to a sleeve carried on the shaft, means, substantially as described, for printing from the wheels, pinions carried by one wheel of each series, operating-racks engaging said pinions, and automatic paper-feeding mechanism for moving forward the paper strips after each impression, substantially as specified.

3. In a check-printing machine, the combination, with two series of number-wheels oppositely arranged with respect to each other, of registering mechanism for causing the wheels to register, printing mechanism and paper-feeding mechanism for each set of wheels, and locking mechanism for holding the wheels during the operation of printing, said locking mechanism being adapted to be tripped by the printing mechanism, substantially as specified.

4. In a check-printing machine, the combination of the shaft B, the number-wheels C C', mounted permanently thereon, the sleeve D, mounted loosely on the shaft between the number-wheels C C' and carrying the number-wheels E E', the pinions $b$ $b'$, attached to the number-wheels E' C', and the bars G G', provided with racks $c$ $c'$, for operating the number-wheels C C' E E', substantially as specified.

5. In a check-printing machine, the combination, with the number-wheels C C' E E', the shaft B, and sleeve D, by which they are carried, of the sprocket-wheels F F', the endless chains $m$ $n$, the sprocket-wheels O P, the wheels M M', pulleys $p$ $p'$, and the endless numbered belts Q Q', substantially as specified.

6. In a check-printing machine, the combination of two series of number-wheels oppositely arranged with respect to each other, the frame U, provided with the adjustable platen $d^2$, the feed-roller $h^2$, the spring-pressed pressure-roller $i^2$, the ratchet-wheel $o^2$, the spur-wheel $o^4$, pinion $o^5$, the bar $q^2$, carrying the stud $p^2$, for engaging the ratchet-wheel $o^3$, the angled lever $r^2$, pivoted to the frame U, and the connecting-link $u^2$, pivoted to the lever $r^2$ and to an ear projecting from the base of the machine, substantially as specified.

7. The combination, with a series of rotating number-wheels, of spring-acted locking-levers normally out of engagement with said wheels, operating-levers for said locking-levers, a platen arranged in connection with said wheels, and a shaft and connections, including a connecting-rod having a projection for engaging the operating-levers of the locking-levers, substantially as described.

SARAH R. MASSEY,
STANLEY A. BRYANT,
*Administrators of the estate of Gideon B. Massey, deceased.*

Witnesses:
A. T. HOFFMAN,
EDWD. M. CLARK.